(No Model.)
J. W. CAIRNS.
POTATO SEED CUTTER.
No. 533,702. Patented Feb. 5, 1895.
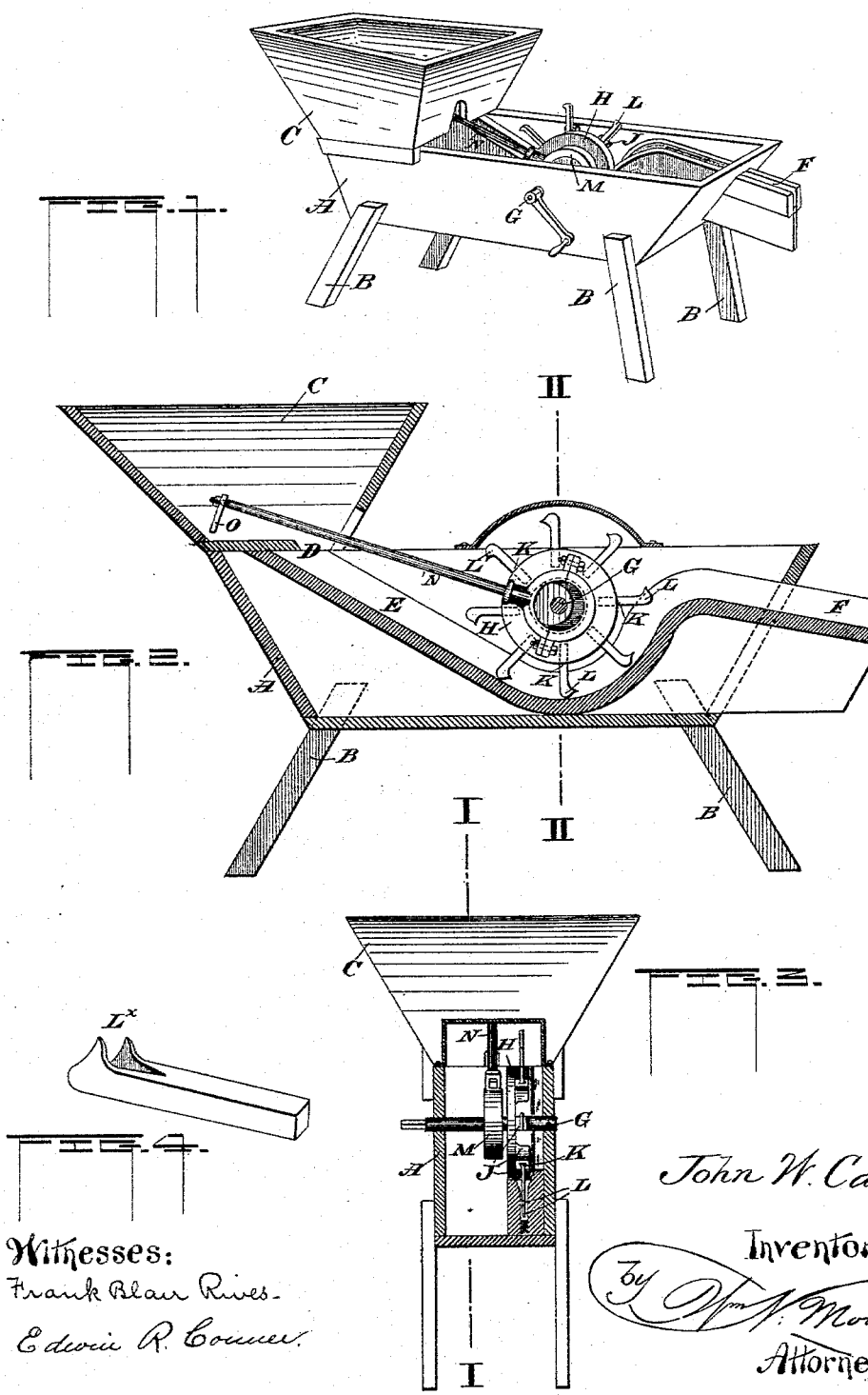
Witnesses:
Frank Blair Rives
Edwin R. Conner
John W. Cairns
Inventor,
by Wm. F. Moore,
Attorney.

UNITED STATES PATENT OFFICE.

JOHN W. CAIRNS, OF CUMMINGS, KANSAS.

POTATO-SEED CUTTER.

SPECIFICATION forming part of Letters Patent No. 533,702, dated February 5, 1895.

Application filed June 1, 1894. Serial No. 513,168. (No model.)

*To all whom it may concern:*

Be it known that I, JOHN W. CAIRNS, a citizen of the United States, residing at Cummings, in the county of Atchison and State of Kansas, have invented certain new and useful Improvements in Potato-Seed Cutters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in potato seed cutters, and the object of my invention is the provision of a simple, durable and inexpensive machine which will quickly and properly cut potatoes into small pieces to be used in planting.

The invention consists of a machine embodying novel features of construction and combination of parts substantially as disclosed herein.

In order that the details of construction and the operation and advantages of my machine may be understood I have illustrated in the accompanying drawings a machine constructed according to my invention.

Figure 1 represents a perspective view of my machine. Fig. 2 represents a vertical longitudinal section on line 2—2 of Fig. 1. Fig. 3 represents a vertical transverse section on line 1—1 of Fig. 1. Fig. 4 represents a detail view of the different forms of knives or cutters used by my machine.

In the drawings—A designates the receptacle supported upon legs B and C designates a hopper arranged at one end of the receptacle and having a discharge opening D, which opens into the curved or segmental trough or chute E, arranged in the bottom of the receptacle and from the other end of the trough or chute leads the discharge spout F, by means of which the slices of potatoes are carried to a suitable receiving vessel. In the receptacle is mounted a shaft G, on which is a disk or wheel H, having a series of radial or inclined sockets J, in which fit the shanks K, having the blades or knives L arranged at a right angle to the shanks, and on the shaft is mounted an eccentric M, to which is connected one end of a rod N, the other end extending into the hopper and having a finger O, the purpose of which is to engage the potatoes in the hopper and draw them out into the chute where they will be acted upon by the knives. The blades if desired may have two cutting edges as seen at $L^x$ and by this construction the potato may be cut into several smaller pieces.

In operation the shaft is turned by means of the crank thereon which action causes the finger of the rod to draw a potato out into the chute where it is cut by the knives and the pieces are carried up and delivered through the discharge spout to a receiving vessel, as is evident. It will be seen that I provide a machine which possesses merit in point of simplicity and inexpensiveness and by means of which the potatoes may be cut into small pieces to be used as seed, in a rapid manner. I would also state that my machine may be used for cutting any kind of vegetable or fruit as found desirable.

I claim—

The herein described potato seed cutter, consisting of the receptacle, the hopper at one end of the receptacle, the discharge spout at the other end, the curved or segmental trough communicating with said hopper and spout, the shaft mounted in the casing, the disk on said shaft, the shanks fitting and secured in the disk, the blades or cutters on the shanks at a right angle thereto the disk, the band around the eccentric, and the arm leading from the band into the discharge or feed opening of the hopper and having a finger for drawing the potatoes into the curved trough to be cut.

In testimony whereof I affix my signature in presence of two witnesses.

JOHN W. CAIRNS.

Witnesses:
J. H. TITSWORTH,
E. NELLIE TITSWORTH.